Nov. 27, 1951     B. L. PADGETT     2,576,888
CHART DISPLAY CABINET
Filed July 26, 1945     4 Sheets-Sheet 1
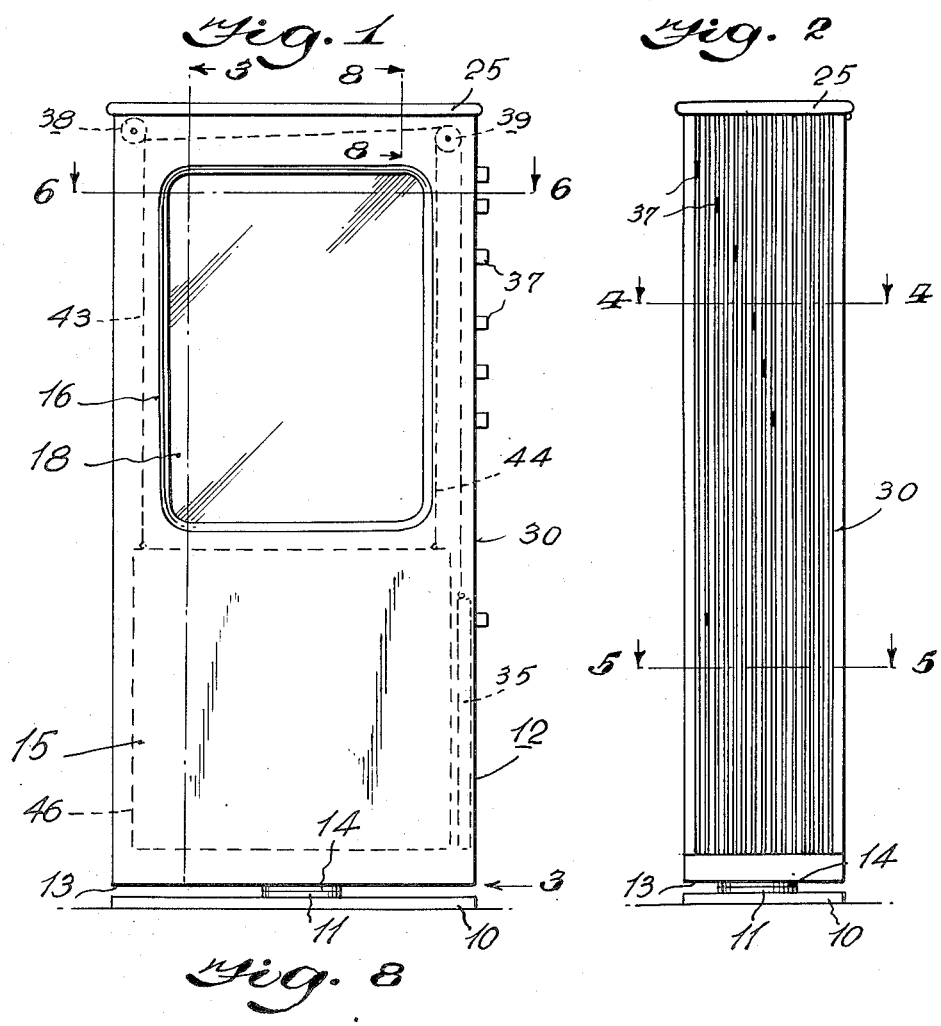
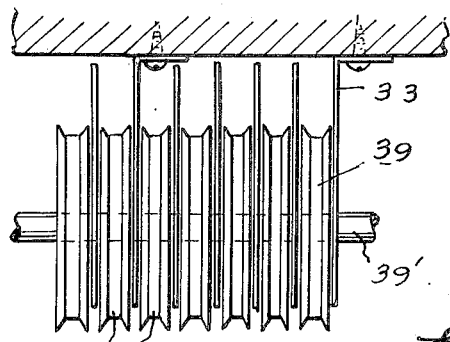
Inventor:
B. L. Padgett,
By Elmer Stewart
Attorney

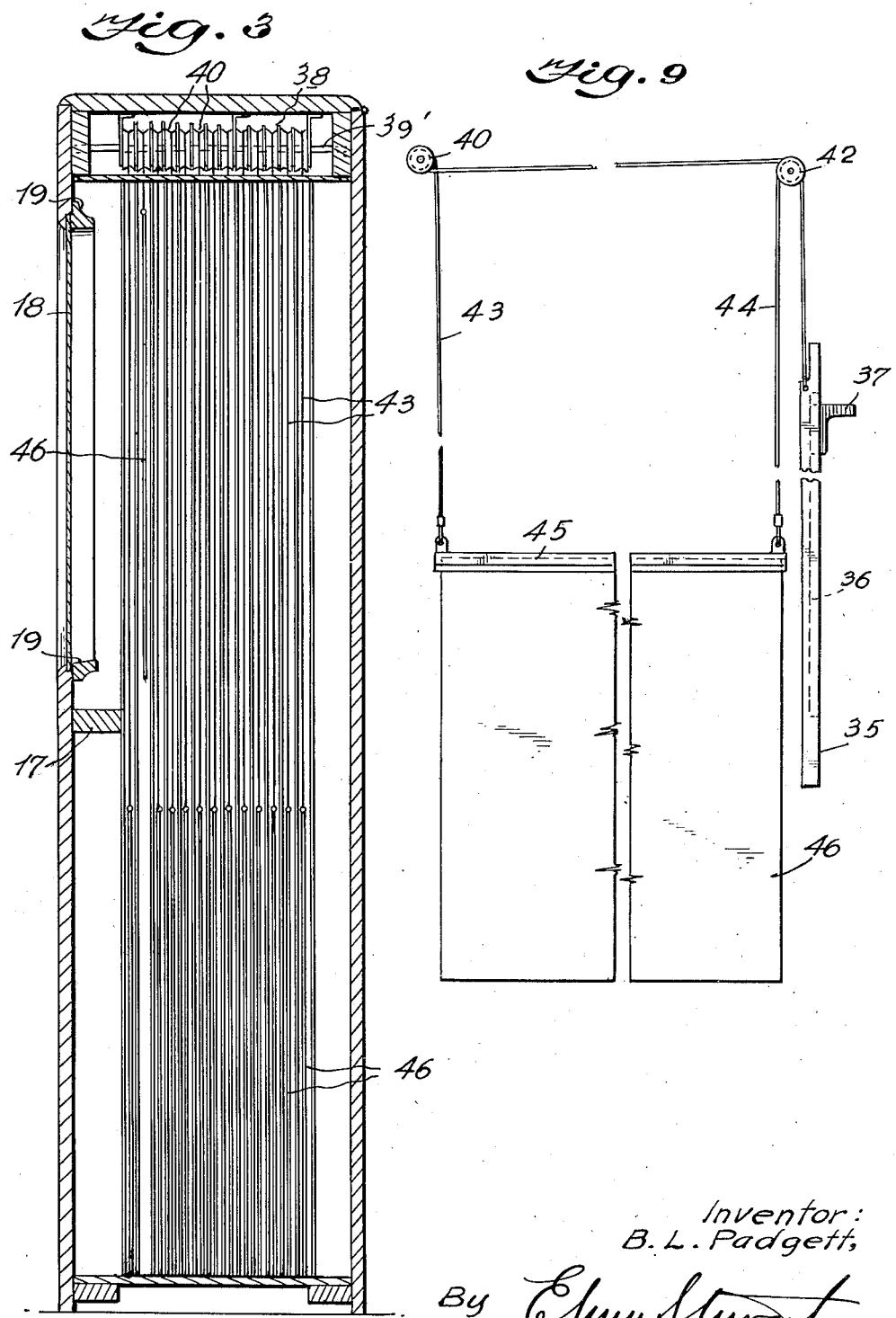

Nov. 27, 1951  B. L. PADGETT  2,576,888
CHART DISPLAY CABINET
Filed July 26, 1945  4 Sheets-Sheet 3

Inventor:
B. L. Padgett,
By Elwin Stewart
Attorney

Nov. 27, 1951 B. L. PADGETT 2,576,888
CHART DISPLAY CABINET
Filed July 26, 1945 4 Sheets-Sheet 4

Inventor:
B. L. Padgett,
By Elmer Stewart
Attorney

Patented Nov. 27, 1951

2,576,888

UNITED STATES PATENT OFFICE 2,576,888

CHART DISPLAY CABINET

Benjamin L. Padgett, Washington, D. C.

Application July 26, 1945, Serial No. 607,119

3 Claims. (Cl. 40—65)

The invention to which the following description relates is that of a display cabinet for visual reference material such as charts, maps, placards, posters, diagrams and the like.

It is frequently found necessary in offices, conference rooms, class rooms, show rooms and the like to provide for the selective display of any one of a number of previously prepared charts. In this way it is possible to provide material for visual reference. At the same time it is sometimes necessary to take into consideration limitation in space and the necessity of protecting the material from loss. As examples of this idea it is frequently necessary to display for reference and study, one of a series of charts dealing with mechanical construction or charts showing statistics on the volume and type of sales, production, or similar data. Instruction is greatly facilitated by having at hand a convenient supply of charts and diagrams on the subject being dealt with.

It is the prime purpose of my invention to provide a display cabinet for charts, maps, diagrams and the like in which a large number of such charts may be stored and any one of them quickly and easily selected and brought into position for display or study.

Another object of my invention is to reduce the space required for the storage of such charts to the minimum or in the alternative to increase the number of charts that may be stored and successively displayed from a cabinet of any given size.

A further object of my invention is to provide security in the storage of such charts when not in use.

A still further object of my invention is to provide means within the cabinet for adequately illuminating the selected chart, diagram, or map.

As illustrating the preferred form of my invention I have shown upon the accompanying drawings a cabinet constructed according to the principles above set forth. In the drawings:

Fig. 1 is a front elevation of the improved cabinet;

Fig. 2 is a side elevation of the same;

Fig. 3 is an enlarged vertical section on the line 3—3 of Fig. 1 showing an alternative non-rotary base;

Fig. 8 is a fragmentary plan view of the pulleys for the counterweights; and

Fig. 9 is a front elevation of the assembly of an individual chart with its counterweight and index tab.

Figure 4:
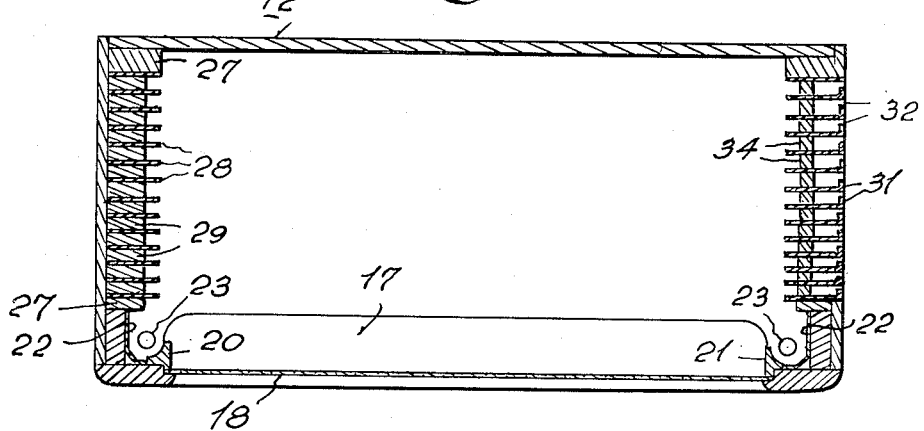
Fig. 4 is an enlarged horizontal section on the line 4—4 of Fig. 2.

As illustrating the invention I have shown my cabinet as used for securely storing a large number of charts, diagrams, maps and the like within a compact space but readily available for the selection and illuminated display of any one of the charts. The particular cabinet is one which has been found of great advantage in the control room of an aviation system for the display of reference material such as diagrams, maps, statistics and notices.

The novel cabinet is intended to occupy a relatively small rectangular floor space. It thus has a base 10 upon which it rests. This provides for rotating the cabinet easily in the event that it is desired to display the charts through both the front and back of the cabinet. However, as shown in Fig. 3, the cabinet may be arranged to stand in fixed position when the charts are to be displayed through the front panel only.

The base 10 has a center bearing casting 11 which provides the ball bearing race at the center.

The cabinet 12 also rectangular in plan view, has a bottom 13 with a central bearing 14 corresponding to the bearing 11 on the base. Ball bearings, not illustrated, interposed between the bearings 11 and 14 permit ready rotation of the cabinet upon the base.

The solid fixed front 15 of the cabinet has a window 16 in the upper portion. This window 16 is proportioned to permit the display of the largest size of chart desired. The inside of the window has a sill 17 which forms a narrow partition between the upper or display portion and the lower or storage portion of the cabinet.

The window 16 is preferably covered with a sheet of glass 18. This glass is held in place by means of an interior molding 19 which extends around the entire opening as shown in Figs. 1 and 3.

Figure 6:
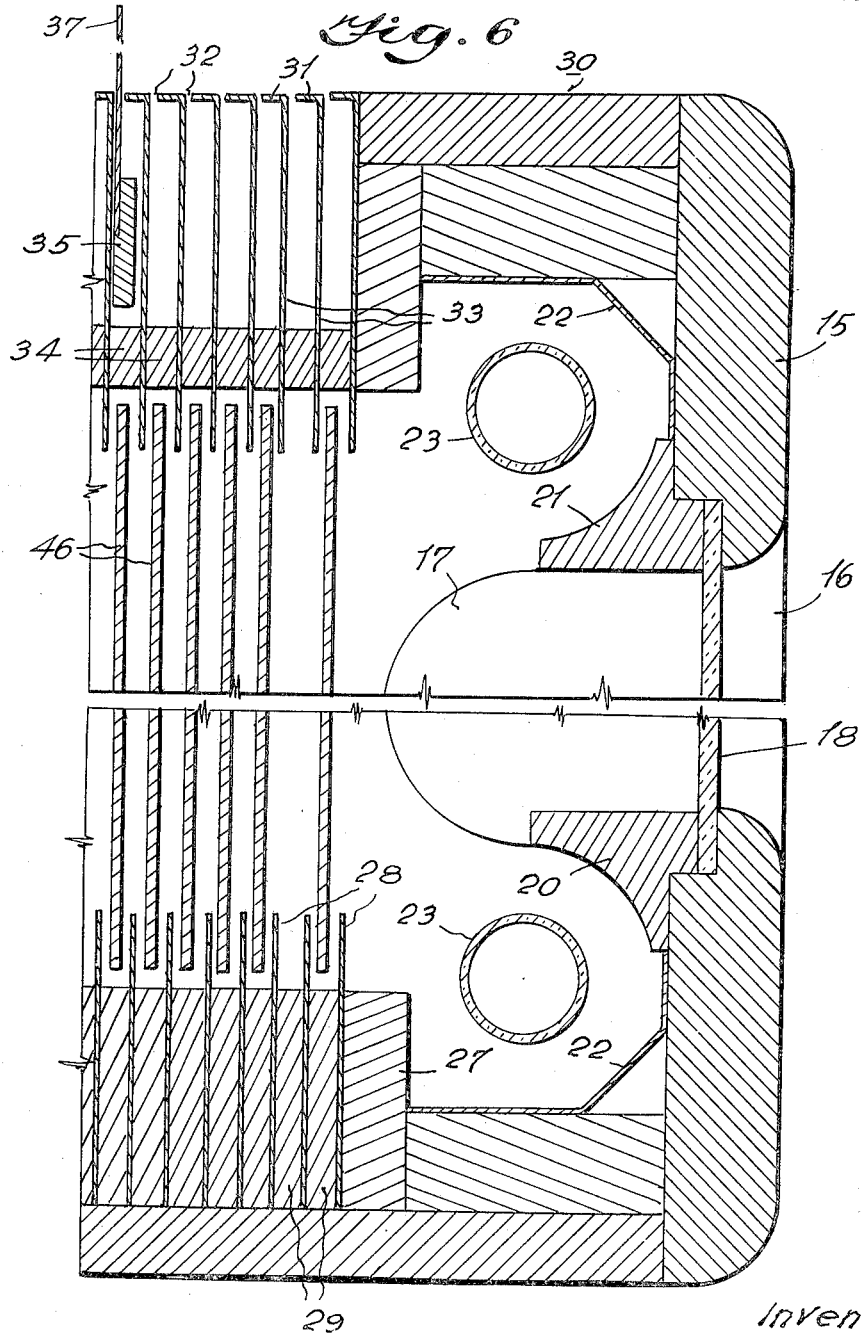
Fig. 6 is a further enlarged horizontal section, partly broken away taken on the line 6—6 of Fig. 1.

The side moldings 20 and 21 are curved inwardly or recessed as shown in Figs. 4 and 6. Provision is thus made for a reflecting liner 22 within the space adjoining the curve or cove of the molding and covering the latter. Tubular lamps or other translucent units 23 are mounted within the reflectors. These lamps are lighted by means of electric switches, not illustrated, but which are operated when the charts are displayed.

The top of the cabinet has a hinged lid 25 providing access to the upper or display portion of the cabinet. It is thus possible to remove and replace individual charts whenever desired.

Figure 5:
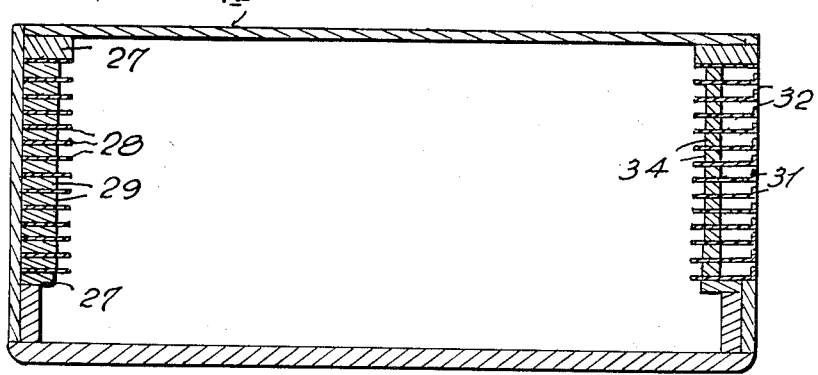
Fig. 5 is an enlarged horizontal section on the line 5—5 of Fig. 2.

The left side of the cabinet is equipped with a series of vertical guides forming adjacent channels through which the individual charts are raised and lowered. As shown in Figs. 3, 5 and 6 these guides are spaced between vertical end strips 27, 27. Between the end strips 27 there is a series of parallel intermediate guides 28 preferably made of sheet metal. The guides 28 extend up to a point adjacent the lid 25 and serve to hold the edge of the chart being displayed.

Figure 7:
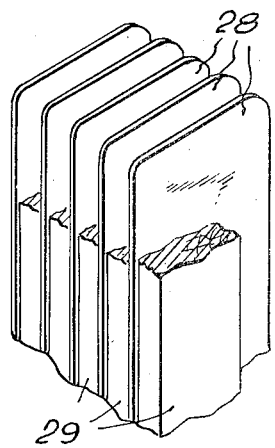
Fig. 7 is a fragmentary perspective view of the left hand guides.

The guides 28 are separated from each other by means of filler strips 29 of wood, fiber or the like. These filler strips 29, as shown in Fig. 7, are not as wide as the guides 28. The guides therefore form channels for the edges of the chart panels and project far enough vertically to hold the side edges of the charts on display and at the same time permit the movement vertically through the lid of those chart panels to be removed or replaced.

The right side 30 of the cabinet is mainly built up with a series of narrow vertical bars 31 separated by narrow slots 32. This arrangement provides for a satisfactory housing and at the same time permits the projection of vertically slidable tabs by which the charts may be raised and lowered from outside the cabinet.

The bars 31 as shown in Fig. 6, are built up of sheet metal strips 33. These strips 33 extend the full inner height of the cabinet. The inner edges project within the open interior of the cabinet while each outer edge forms a right-angled flange which constitutes the bar 31.

A series of vertical filler bars 34 are attached between adjacent strips 33 in a plane intermediate the edges. The thickness of the filler bars 34 is such that the flanges 31 are spaced slightly from the adjacent strips 33 in order to provide the vertical slots 32.

The space between adjacent strips 33 and extending laterally from the flanges 31 to the filler bars 34 form vertical channels or passageways in which counterweights can move freely.

The counterweights 35 are relatively long bars as shown in Fig. 9. Each counterweight is rabbeted as shown at 36. This permits the attachment to the counterweight of an index tab 37 in an adjusted vertical position thereon. This tab fits within the rabbet as shown in Fig. 6 so as not to increase the thickness of the counterweight 35. An outwardly extending portion of the tab 37 projects beyond the flange 31 and may be suitably marked to indicate the position of the tab in relation to those in adjacent slots or to identify the subject matter of the chart mounted in this place in the series.

Housed in opposite corners in the top of the cabinet are two series of pulley assemblies 38, and 39. The assembly 38 on the left side of the cabinet comprises an idle shaft 39 fixedly mounted in the cabinet and running from front to rear. This shaft has a series of spaced pulley wheels 40 loosely journalled on the shaft. This shaft passes through the upper ends of the strips 33. Some of the strips 33 have right angle extensions 41 by which they are attached to the cabinet.

The right hand side of the cabinet is similarly equipped. Pulleys 40, 42 are loosely journalled on the shafts 39. Pulleys 40, 42 overhang the filler bars 34. Cables 43 and 44 run over the pulleys 40 and 42 respectively and are attached to the upper ends of the corresponding counterweights 35.

The free end of each cable 43 and 44 is attached to one end of a chart holder 45. This may take the form of a slotted bar in which a panel 46 is removably hung. The panel 46 serves as a mounting for the chart, map or other material which it is desired to display.

Alternatively the panel 46 may be a transparent envelope through which the chart may be displayed. In this case both sides of the chart may be selectively displayed.

In the use of this cabinet access through lid 25 will permit the panels 46 to be inserted in the holders 45. Each channel may carry printed material or other indicia on one or both sides. After the panels are mounted in the holders they may be lowered into the lower or storage part of the cabinet on cables 43 and 44. In this operation the counterweight 35 is lifted into its upper position and the tab 37 will take its proper position in the series as indicated in Fig. 2.

A suitable index may be posted to indicate the material on the several panels. Any panel may then be selectively raised into position opposite the window by lowering the tab 37 and associated counterweight 35. The panel 46 will then remain in position until covered by one in front or until the tab 37 is lifted again.

By mounting material on opposite sides of the panel 46 and providing the rear of the cabinet with a window 19 the capacity may be doubled without increase in size of the cabinet.

Any panel may be removed through lid 25 when the panel is in the upper position. This provides facility in changing the material on display without disturbing the arrangement of other material. The right hand side of the cabinet is open only to the extent of the narrow slots 32. There is thus no likelihood of dust or dampness penetrating the counterweight channels. Even in this event, the cabinet is further closed by means of filler bars 34. In this way the contents of the cabinet are protected from dust and dampness as well as being locked against unauthorized access.

While I have described in detail the preferred form of my invention, it will be clearly apparent that it is possible to make any changes in minor details, proportions and materials without departing from the scope of the invention as defined in the following claims.

What I claim is:

1. A display device comprising a cabinet having a storage portion and a display portion with a window, a series of spaced parallel guides mounted on one side of the cabinet, a series of parallel plates mounted on the opposite side of the cabinet, spacers between said plates, said spacers exposing the inner edges of the plates to form a second series of guides, panels movable in said guides from one to the other portion of the cabinet, the said plates extending outwardly of the spacers to form channels, counterweights in said channels, a series of pulleys over each series of guides, cables over the pulleys connecting the panels, and counterweights and operating means on each counterweight extending outwardly from the side of the cabinet.

2. A display device comprising a cabinet having a storage portion and a display portion with a window, a series of spaced parallel guides mounted on one side of the cabinet, a series of parallel plates mounted on the opposite side of the cabinet, spacers between said plates, said spacers exposing the inner edges of the plates to form a second series of guides, panels movable in said guides from one to the other portion of the cabinet, the said plates extending outwardly of the spacers, and terminating in flanges to form channels, counterweights in said channels, a series of pulleys over each series of guides, cables over the pulleys connecting the panels and counterweights and operating means on each counterweight extending outwardly between the said flanges.

3. A display device comprising a cabinet having a storage portion and a display portion with a window, a series of spaced parallel guides on opposite sides of the cabinet, panels movable in said guides from one to the other portion of the cabinet, a series of pulleys above each series of guides, one series of guides being extended outwardly to form channels, counterweights in said channels, cables over the pulleys connecting the panels and counterweights and tabs adjustably mounted on the counterweights and extending outwardly of the sides of the cabinet.

BENJAMIN L. PADGETT.

REFERENCES CITED

The following references are of record in the file of this patent:

UNITED STATES PATENTS

| Number | Name | Date |
| --- | --- | --- |
| 404,805 | Taylor | June 4, 1889 |
| 686,869 | Van Noorden | Nov. 19, 1901 |
| 687,815 | Coe | Dec. 3, 1901 |
| 729,843 | Carr | June 2, 1903 |
| 826,228 | Coats | July 17, 1906 |
| 946,649 | Woernle | Jan. 18, 1910 |
| 1,058,207 | Van Allen | Apr. 8, 1913 |
| 1,766,940 | Powell | June 24, 1930 |
| 1,972,416 | Bascom | Sept. 4, 1934 |
| 2,147,773 | Larson | Feb. 21, 1939 |
| 2,220,478 | Curnutt | Nov. 5, 1940 |

FOREIGN PATENTS

| Number | Country | Date |
| --- | --- | --- |
| 124,502 | Switzerland | Apr. 2, 1928 |
| 541,024 | France | Apr. 26, 1922 |